US009850118B2

(12) United States Patent
Deo et al.

(10) Patent No.: US 9,850,118 B2
(45) Date of Patent: Dec. 26, 2017

(54) BAG-IN-BOX PUMP SYSTEM

(75) Inventors: Indrani Deo, Ossining, NY (US); Steven Jersey, Laguna Niguel, CA (US)

(73) Assignee: PepsiCo, Inc., Purchase, NY (US)

( * ) Notice: Subject to any disclaimer, the term of this patent is extended or adjusted under 35 U.S.C. 154(b) by 542 days.

(21) Appl. No.: 12/860,485

(22) Filed: Aug. 20, 2010

(65) Prior Publication Data

US 2012/0046785 A1 Feb. 23, 2012

(51) Int. Cl.

| | |
|---|---|
| ***B67D 7/74*** | (2010.01) |
| ***B67D 7/62*** | (2010.01) |
| ***G06F 17/00*** | (2006.01) |
| ***B65D 25/16*** | (2006.01) |
| ***B67D 1/10*** | (2006.01) |
| ***B67D 1/12*** | (2006.01) |
| ***F04C 5/00*** | (2006.01) |
| *B67D 1/08* | (2006.01) |

(52) U.S. Cl.

CPC ........... *B67D 1/108* (2013.01); *B67D 1/1231* (2013.01); *F04C 5/00* (2013.01); *B67D 2001/0827* (2013.01); *F04C 2220/24* (2013.01); *F04C 2240/20* (2013.01)

(58) Field of Classification Search

CPC ... B67D 1/108; B67D 2001/0827; F04C 5/00; F04C 2240/20

USPC ....... 222/643, 94, 145.1, 206, 209, 213, 333

See application file for complete search history.

(56) References Cited

U.S. PATENT DOCUMENTS 3,642,390 A * 2/1972 Ostberg ................ F01C 21/106 418/133
3,771,901 A * 11/1973 Svensson .................. F04C 5/00 418/156
3,832,105 A * 8/1974 Takahashi ...................... 418/154
4,096,971 A * 6/1978 Kuckens ............................ 222/1
4,717,047 A * 1/1988 van Overbruggen B67D 1/0079 222/207
4,921,150 A * 5/1990 Lagergren et al. ........... 222/639
4,974,505 A * 12/1990 Torrisi ............................ 99/502
5,000,351 A * 3/1991 Rudick .......................... 222/105
5,121,857 A * 6/1992 Hutchinson .......... B67D 1/0055 222/105
5,353,963 A * 10/1994 Gorski et al. .............. 222/129.1
5,875,930 A * 3/1999 Nakajima et al. ......... 222/129.1
5,988,998 A * 11/1999 Glover ...................... F04C 5/00 418/153
6,003,733 A * 12/1999 Wheeler ............. B67D 1/0004 222/146.5
6,142,340 A * 11/2000 Watanabe ............ B67D 1/0007 222/129.3

(Continued)

OTHER PUBLICATIONS http://www.quantexpumps.com Quantex Pumps, London England—Printed Feb. 18, 2010, Entirety of site—42 pages.

*Primary Examiner* — Michael K Collins

(74) *Attorney, Agent, or Firm* — Sterne, Kessler, Goldstein & Fox P.L.L.C.

(57) ABSTRACT

Systems and methods for packaging beverage components and dispensing beverages are provided. Bag-in-box packages include connectors that contain rotary pumps. Each rotary pump includes a resiliently deformable housing and a rotor that form a plurality of chambers. The bag-in-box package may be incorporated into a dispenser system that includes a touch screen that allows users to input beverage selections.

16 Claims, 10 Drawing Sheets

(56) References Cited

U.S. PATENT DOCUMENTS 6,286,725 B1 * 9/2001 Gerber ............... B65D 47/2031 222/207
6,536,224 B2 * 3/2003 Frank et al. .................... 62/303
6,758,593 B1 * 7/2004 Terentiev .............. A61M 1/127 366/273
6,868,987 B2 * 3/2005 Hedington et al. ............. 222/95
6,974,052 B1 * 12/2005 d'Hond ................. A47J 31/402 222/383.2
7,014,071 B1 * 3/2006 d'Hond ................. A47J 31/402 222/333
7,674,100 B2 * 3/2010 Hayes-Pankhurst A61M 5/14232 418/125
7,861,896 B2 * 1/2011 Biesheuvel ............. G01F 11/22 210/222
8,092,074 B2 * 1/2012 Hahn ...................... F04D 7/045 366/137
8,157,546 B2 * 4/2012 Miyazaki .......... A61M 5/14232 417/474
RE44,841 E * 4/2014 Hayes-Pankhurst A61M 5/14232 418/125
8,870,025 B2 * 10/2014 Reddy ................. F04B 43/1261 222/1
9,175,681 B2 * 11/2015 Hayes-Pankhurst ...... F01O 5/04
2002/0114646 A1 * 8/2002 Sudo .................. G03G 15/0874 399/258
2003/0000964 A1 * 1/2003 Schroeder ............ B67D 1/0021 222/129.1
2004/0047232 A1 * 3/2004 Terentiev ............ B01F 7/00908 366/273
2004/0245124 A1 * 12/2004 Hurst ............................ 206/219
2004/0245144 A1 * 12/2004 Hurst ............................ 206/527
2005/0163637 A1 * 7/2005 Chang ..................... F04B 13/00 417/476
2006/0076251 A1 * 4/2006 Hurst ............................ 206/219
2007/0170212 A1 * 7/2007 Biesheuvel ............. G01F 11/22 222/333
2011/0303693 A1 * 12/2011 Culley .................. F25D 23/126 222/1
2012/0046785 A1 * 2/2012 Deo et al. ..................... 700/231

* cited by examiner

BAG-IN-BOX PUMP SYSTEM

BACKGROUND

Often, at restaurants or other locations such as a consumer's residence, a beverage may be created on-demand from a mixture of ingredients. An advantage of dispensing beverage in this form is that the concentrate containers and water supply typically occupy significant less space than is otherwise required to store the same volume of beverage in individual containers. Moreover, this dispensing equipment likewise eliminates increased waste formed by the empty individual containers.

A typical beverage dispenser may include a pump to force an ingredient, such as a concentrate, to the head. The dispenser may include valves that may attempt to volumetrically measure then dispense certain ingredients. For example, a valve may be selectively opened in response to a consumer requesting a beverage to allow the simultaneous discharge of concentrate and water. The two liquids mix upon discharge and in the container to form the desired beverage. Moreover, some beverages are formed from base components that may be vastly different from the components forming other beverages. Often, these beverages cannot be accurately and efficiently dispensed from a dispenser given the problems with measuring and dispensing ingredients with different properties.

Similarly, in certain implementations, different beverages are formed from concentrates that are only slightly different from each other. For example, customers are often interested in enjoying beverages that, in addition to a base flavor, include a supplemental flavor, such as cherry or lemon-lime. Yet consumers are increasingly interested in adjusting one or more ingredients in their beverages, such as the amount of sugars, often in the form of high fructose corn syrup. Improved systems and methods relating to the dispensing of beverages would be desirable.

SUMMARY OF THE INVENTION

Aspects of this disclosure relate to novel methods for dispensing a composition, such as a beverage. In certain embodiments, a bag-in-box package is utilized. The bag-in-box package includes a rigid box and a flexible bag disposed within the box. The flexible bag includes a connector projecting outwardly of the box. A rotary pump is located within the connector. The rotary pump includes a resiliently deformable housing and a rotor that form a plurality of chambers. The bag-in-box package may be incorporated into a dispenser system that includes a touch screen that allows users to input beverage selections. One or more memory devices store audio and video files related to different beverage selections. While a beverage is dispensed, a sound file may be played. For example, a bubbling sound may be played while a carbonated beverage is dispensed. At the same time or alternatively, a video may be played on the touch screen display that shows the fill state of a beverage container.

Of course, the methods and systems of various embodiments may include other additional elements, steps, computer-executable instructions, computer-readable data structures or computer system components. In this regard, other embodiments are disclosed and claimed herein as well.

DETAILED DESCRIPTION OF THE PREFERRED EMBODIMENT

Figure 1:
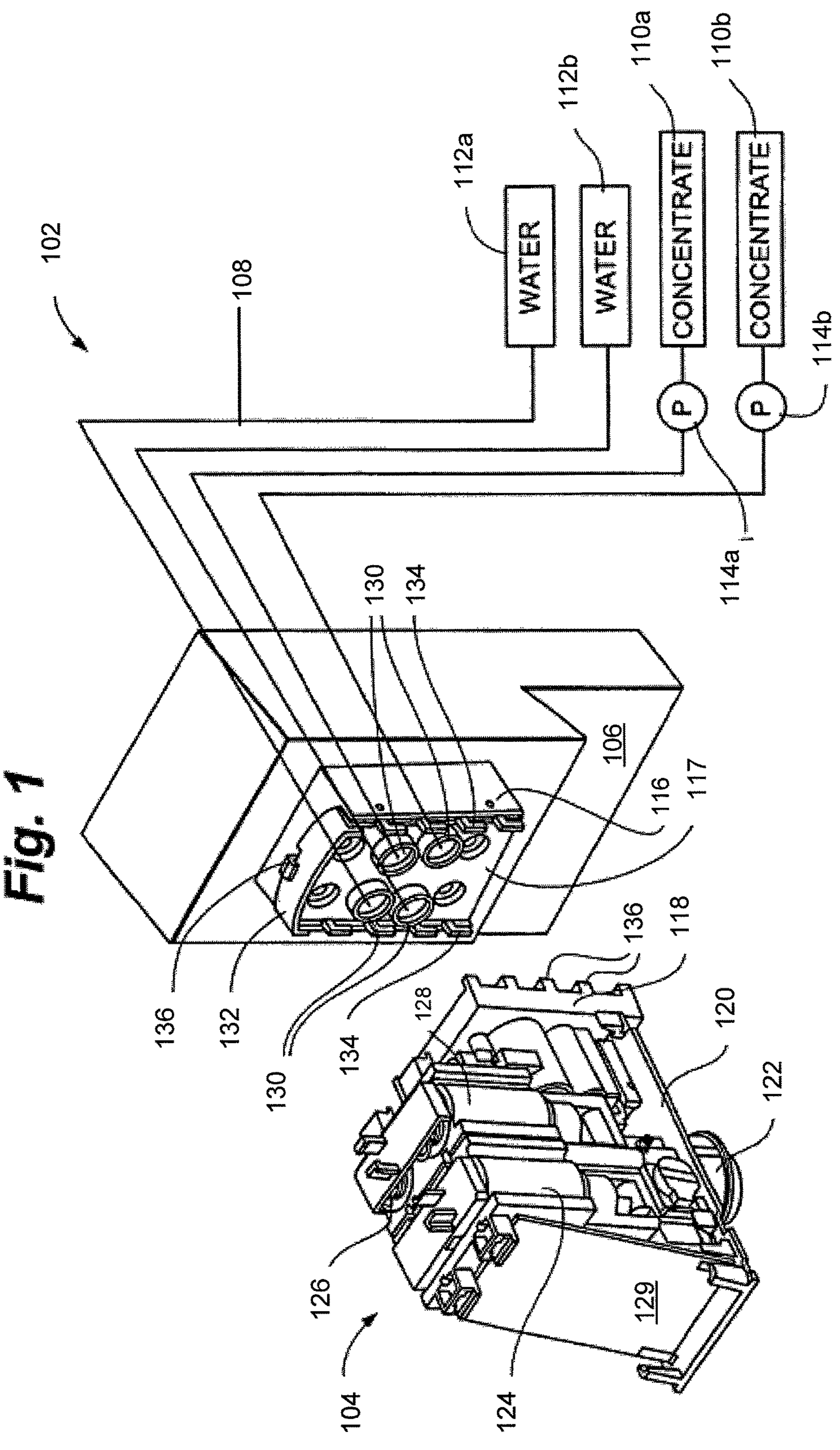
FIG. 1 is an exploded view and schematic diagram of an exemplary dispensing system and dispensing head in accordance with one embodiment of this invention.

FIG. 1 illustrates an exemplary dispensing system 102 that may be configured to dispense a beverage comprising a plurality of ingredients. While the exemplary dispensing system 102 will be described in the context of dispensing a beverage, those skilled in the art will appreciate that other compositions, such as medicaments, lotions, supplements, condiments, may be dispensed according to the teachings of this disclosure. Looking to FIG. 1, the exemplary dispensing system 102 includes a dispensing head 104, and a counter-located base 106, to which the dispensing head 104 may be removably mounted. Reservoirs 110*a* and 110*b* may store ingredients configured to be dispensed from dispensing system 102, such as flavored concentrates that may be in different forms, such as liquids (including syrups) or powders. Pumps 114*a* and 114*b* may be connected to reservoir 110*a* and 110*b*, respectively. The pumps 114*a* and 114*b* allow the movement of the associated ingredient through base 106 and into the dispensing head 104. A portion of the ingredients may comprise water (for example, see elements 112*a* and 112*b*). In one embodiment, one water source may supply a noncarbonated water stream. The second source may include a carbonator (not illustrated) that supplies carbon dioxide to the water stream it supplies through base 106 into the dispensing head 104. In another embodiment, the water source may be substantially devoid of carbonation. In yet other embodiments, a plurality of water sources may be configured to provide different levels of carbonated water.

The tubing 108 through which the four illustrated fluid streams flow into the base 106 may terminate at mounting block 116. As seen in FIG. 1, mounting block 116 may be removably mounted to the dispensing head 104. In the illustrative embodiments, mounting block 116 may have a front face 117 comprising passageways 118 to one or more reservoirs for one or more ingredients such as concentrate 110*a*/110*b* and/or water 112*a*/112*b*. The passageways 118 may be integrally formed with and extend from the block front face 116. The front face 116 and/or another portion of the mounting block 116 may further comprise a locking mechanism for aligning and ensuring proper fitting between the passageways 118 and the dispensing head 104.

The illustrated dispensing head 104 includes a vertical back plate 118 from which a base plate 120 extends horizontally. Back plate 118 may be removably coupled to dispensing unit mounting block 116 and a valve body 132 may be seated on the base plate 120. A nozzle assembly 122 is shown to extend below the base plate 120. Valve body 132 may comprise a plurality of conduits 130 through which the ingredients flow into nozzle assembly 122. One or more valve units may be mounted to the valve body 132. For example, valve units 134 and/or 136 may regulate the flow of a separate one of the fluid streams through the dispensing head 104 and out of the nozzle assembly 122.

The dispensing system 102 may comprise one or more computer-readable mediums, such as circuit board 129. Circuit board 129 is shown mounted to the base plate 120 and may comprise the electrical components (not illustrated) that are used to regulate the actuation of pumps 114*a* and 114*b* and/or valve units 134, 136. Circuit board may also comprise computer-readable instructions that when executed by a processor, such as processor (such as processor 206, described in more detail below in relation to FIG. 2) to provide energization signals to valve units 134, 136, control signals to the pumps 114*a* and 114*b*, and/or feedback signals from the dispensing head 104 to the dispensing system 102.

Historically, electronic circuitry 129 (or another component comprising a computer-readable medium, comprised a "flavor chips." The flavor chip comprised computer-executable instructions, that when executed by a processor, would execute a method for mixing a predefined beverage. Unfortunately, past flavor chip technology had to be adapted to the mechanical properties of each dispenser and each flavored beverage required a separate flavor chip. Thus, in certain prior art systems, changing beverages to be dispensed from a dispenser would require the new flavors to be "mapped" onto the chip. For example, each parameter had to be adjusted to ensure the dispensed beverage received the intended proportions of ingredients. Aspects of the invention relate to systems and methods for dispensing custom beverages that do not require the inconvenience of mapping of different flavor chips for each possible combination of the various ingredients.

While FIG. 1 shows one exemplary dispensing system 102, those skilled in the art will readily appreciate that other systems that are either configured or able to be modified to dispense a multi-ingredient beverage according to one or more teachings of this disclosure are within the scope of the invention. Further exemplary systems, including exemplary heads and/or nozzles that may be selectively combined are disclosed in Assignee's U.S. patent application Ser. No. 10/412,681, BEVERAGE FORMING AND DISPENSING SYSTEM, filed Apr. 14, 2003, U.S. Patent Pub. No. 2004/0084475 A1, published May 6, 2004, and/or U.S. patent application Ser. No. 11/118,535, BEVERAGE DISPENSING SYSTEM WITH A HEAD CAPABLE OF DISPENSING PLURAL DIFFERENT BEVERAGES, filed Apr. 29, 2005, U.S. Pat. Pub. No. 2006/0097009, which are incorporated herein by reference in their entirety for any and all purposes.

Figure 2:
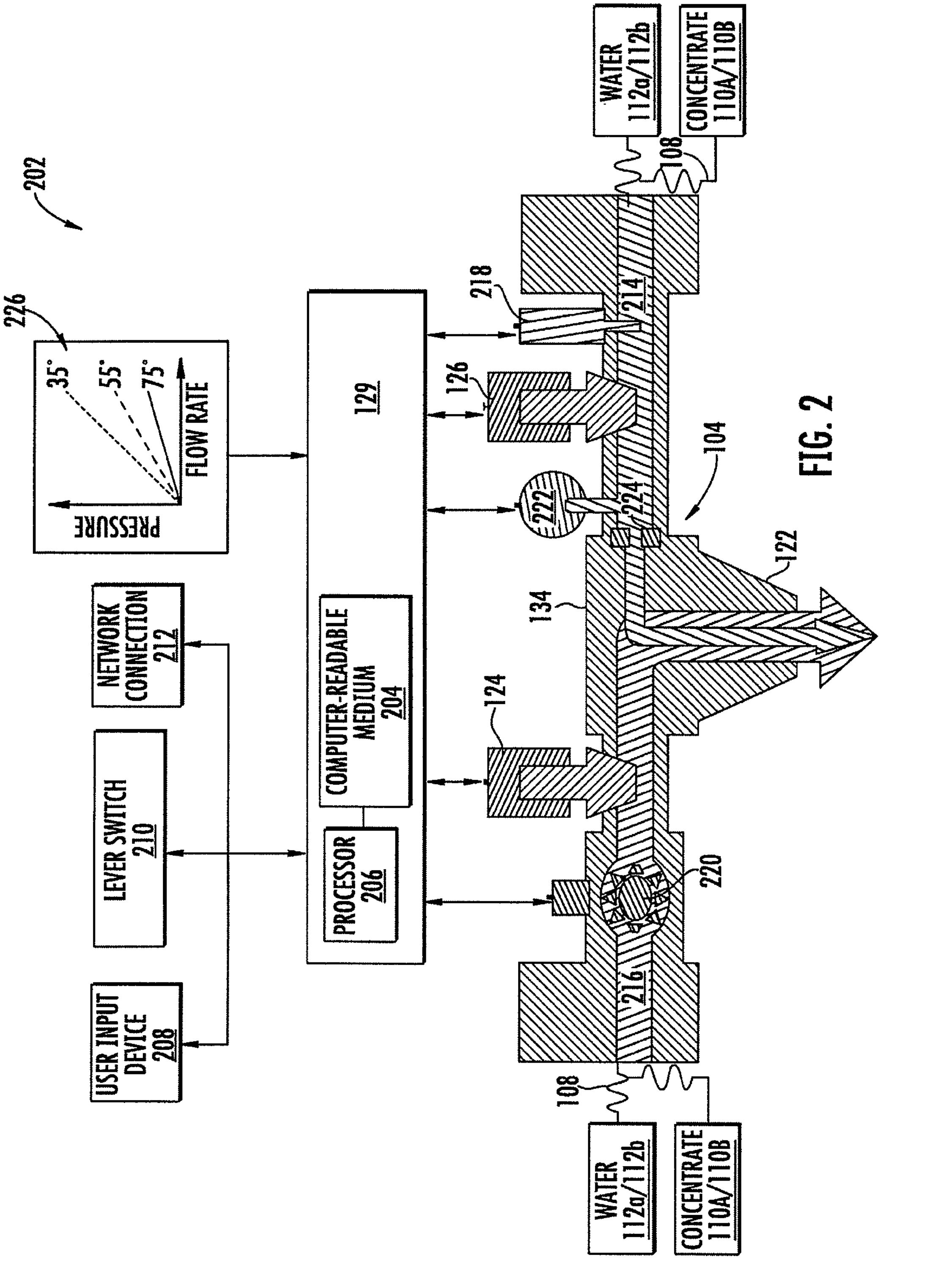
FIG. 2 shows an exemplary embodiment of one dispensing system in accordance with one embodiment of the invention.

FIG. 2 shows an exemplary dispensing system 202 that may be configured for use without prior art flavor chips to dispense custom beverages. Dispensing system 202 may be configured to implement novel methods, such as the methods shown in the flowchart of FIG. 3. In this regard, certain novel features of dispensing system 202 will be described in relation to the methods of FIG. 3, however, the novel apparatus shown in FIG. 2 is not limited to only these methods but are merely provided to demonstrate exemplary uses of dispensing system 202. As seen in FIG. 2, dispensing system 202 comprises an electronic circuitry 129, which may be identical or similar to electronic circuitry 129 shown in FIG. 1. Electronic circuitry 129 comprises a computer-readable medium 204 which may be magnetic, digital, optical, or any format configurable to comprise computer-executable instructions that may be executed by a processor, such as processor 206.

Processor 206 may be configured to execute instructions on the computer-readable medium, such as computer-readable medium 204, received from a user input device 208, lever switch 210 and/or a network connection 212. The user input device 208 may include any components or group of components (including a switch similar or identical to lever switch 210) that allows a user to provide an input to dispensing system 202, which may be mechanical, electrical, or electromechanical. Novel uses of user input device 208 may be implemented in accordance with one or more novel methods described herein. As one example, user input device 208 may be used in conjunction with step 302 shown in FIG. 3. At step 302, instructions may be received for dispensing a beverage. In one embodiment, user input device 208 may allow a user to instruct dispensing system 202 to dispense a specific beverage formula. In one embodiment, user input device 208 may comprise a touch screen that is in operative communication with electronic circuitry 129. The touch screen may be configured to display a plurality of beverage classes. For example, in one embodiment, the classes may include, but are not limited to: colas, diet colas, energy drinks, water, fruit juices and combinations of any of these groups. In certain embodiments, a user may be able to pick a beverage class from a group of classes. In various embodiments, the display of possible beverage for selection may be adjusted based upon the levels or presence of specific ingredients detected in dispensing system 202.

The touch screen may be configured to allow a user to first select a specific brand of beverage, such as a particular energy drink from a plurality of energy drinks. Still yet, the touch screen may allow a user to pick a specific commercially available beverage and further refine the ingredients to be dispensed to form a similar beverage. In one embodiment, the refined beverage has the same ingredients, however, comprises different proportions or amounts of the ingredients. For example, a user may first select the cola beverage "Pepsi," and then wish to adjust one or more parameters of the Pepsi to be dispensed. For example, the user may wish to adjust the sugar content and/or carbonation of the beverage to be dispensed. In another embodiment, the refined beverage has at least one different ingredient, for example; at least a portion of the high fructose corn syrup may be replaced with various levels of one or more ingredients.

While the exemplary embodiment was described in relation to a touch screen, other input devices may be used in combination with or in lieu of a touch screen. For example, a user may swipe a card having electronic information a sensor, such as for example, an optical, magnetic, or RFID sensor to provide a user input. In another embodiment, the user may utilize a biometric input to provide an input. Yet in other embodiments, the user may enter alphanumeric inputs using a keyboard. The lever switch 210 may also be operatively connected to electronic circuitry 129 to provide an input indicative that a receptacle is placed under the nozzle 122.

Network connection 212 may also provide one or more user inputs (as well as transmit outgoing signals) coupling dispensing system 202 to a communication network, such as a LAN or the Internet. The dispensing system 202 (and other devices) may be connected to a communication network via twisted pair wires, coaxial cable, fiber optics or other media. Alternatively, radio waves may be used to connect one or more beverage dispenser systems to the communication network. In one such embodiment, one or more dispensing systems may be in communication with each other and readily transmit and receive information regarding other dispenser systems, including a unique formula dispensed to a particular user. In one embodiment, a plurality of dispensing systems may each be coupled to each other through a central server. Yet in another embodiment, the dispensing systems may communication directly with each other. Thus, in one or more embodiments, electronic circuitry 129 may include computer-executable instructions for transmitting information to other dispensers and/or a server.

Figure 3:
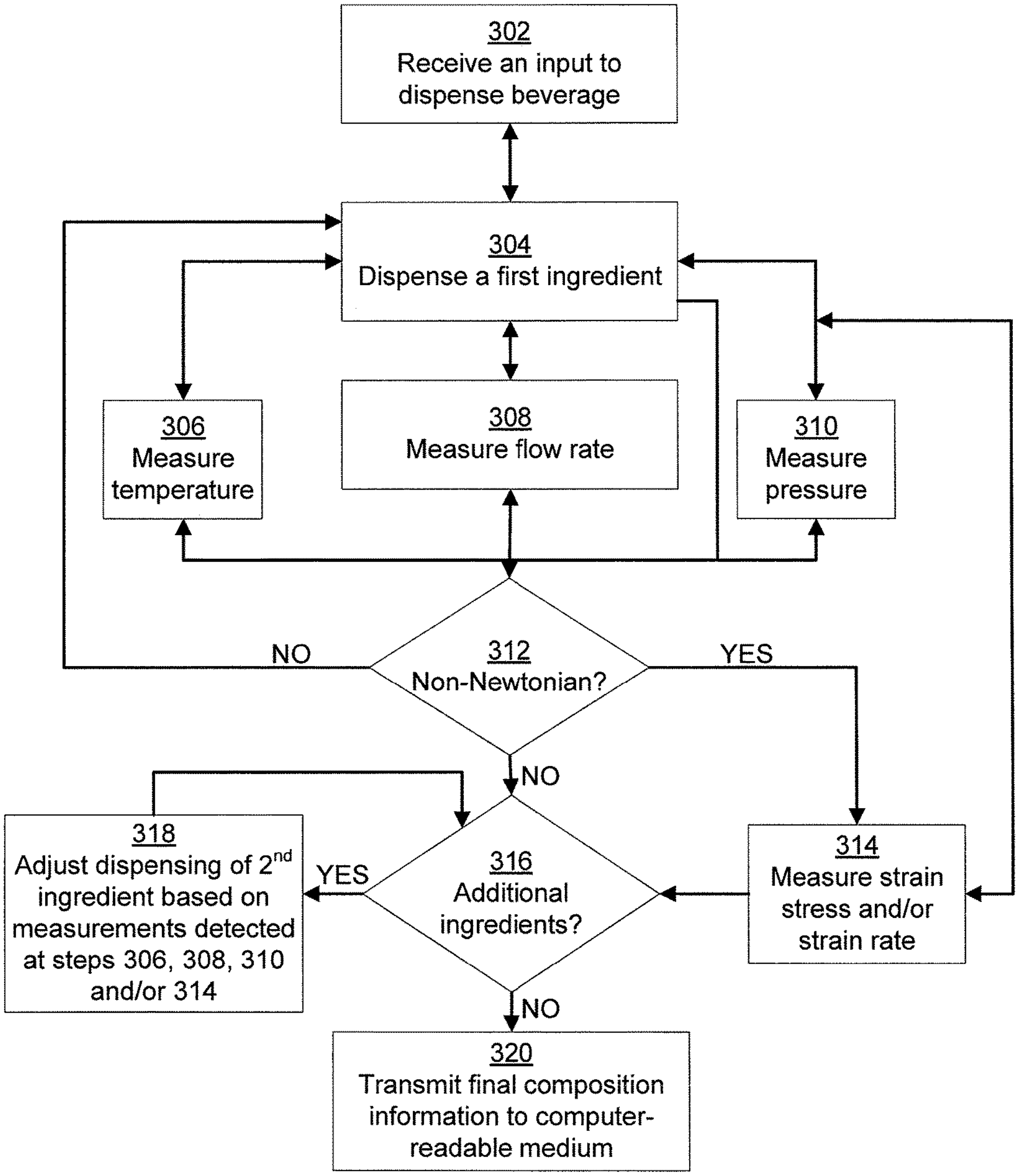
FIG. 3 is a flowchart of an exemplary method in accordance with one embodiment of the invention.

Step 304 of FIG. 3 may be implemented to dispense a first ingredient into a conduit of the dispensing system 202. Looking to the exemplary dispensing system 202 in FIG. 2, a first conduit, such as conduit 214 may also be connected (for example, through a series of valves and/or through tubing 108) to a beverage ingredient source (such, as for example concentrate(s) 110*a*/110*b*). During beverage preparation and dispensing, one or more ingredients, such as water 112*a*/112*b* and/or concentrates 110*a*/110*b* may pass through the first conduit 214. Conduit 214 is merely exemplary, as additional or fewer ingredient sources may be upstream or downstream from conduit 214. Moreover, dispensing system 202 may comprise a plurality of conduits, such as second conduit 216. The second conduit 216 may be in connection with one or more ingredient source, such as water 112*a*/112*b* and/or concentrates 110*a*/110*b*. In the illustrative dispensing system 202, the first conduit 214 and the second conduit 216 diverge at the nozzle 122, where ingredients may be mixed and dispensed from the dispensing system 202.

Regarding the nozzle 122, the illustrated dispensing system 202 of this invention may includes the single dispensing head 104 (shown in FIGS. 1 and 2) with plural passageways, such as conduits 214, 216 (shown in FIG. 2) through which concentrated ingredients may flow. Valve units 124, 126, and 128 may operate independently from each other and be independently controlled. Thus, the disclosed systems 102, 202 may be constructed so that a single dispensing head 104 may be used to discharge beverages blended from any one of two or more distinct ingredients (such as concentrates) to a single nozzle 122. In certain embodiments, this may eliminate the need to provide the system 102 with multiple dispensing heads wherein each head is employed to dispense a single beverage. Other embodiments, however, may implement a plurality or heads and/or nozzles. Regardless of the quantity of nozzles utilized, those skilled in the art will appreciate that valves 124 and 126 may be simultaneously opened to discharge a beverage that is a desirable mixed blend of two or more concentrates or other ingredients.

Dispensing head 104 may be further designed so that the passage of one or more ingredients comprising carbonated water is discharged has a tapered increase in cross-sectional area along its length as measured starting from the top to the bottom. That is, a conduit or passage within dispensing system may be narrow at the high pressure end and widens considerably, to as much as ten times its width at the low pressure end. Consequently, as the water and gas fluid stream flows through a tapered passage, the pressure of the gas bubbles in the stream may decrease continually but gradually. This gradual decrease in pressure reduces the extent the carbon dioxide, upon the discharge an outlet breaks out of the fluid stream. The reduction of carbonation breakout serves to ensure that the blended beverage has sufficient gaseous-state carbon dioxide to impart a desirable taste.

Conduits 214, 216 may comprise a plurality of sensors to measure one or more parameters of one or more ingredients that travel through the respective conduit 214, 216 to the nozzle 122. The measured parameters of a first ingredient may be used to adjust the amount or parameter of a second ingredient to be dispensed. Yet in other embodiments, the measured parameters of the first ingredient may be used to dispense the amount of that ingredient being dispensed. In certain embodiments, several parameters may be measured within conduit 214 and/or conduit 216. In one embodiment, steps 306, 308, and/or 310 may be implemented to measure the temperature, viscosity, pH, flow rate, and/or pressure of a first ingredient in the first conduit. In one embodiment, step 306 may comprise the implementation of temperature sensor 218 (shown in conduit 214), step 308 may include measurements with flow rate sensor 220 (shown in conduit 216) and step 310 may comprise measurements from PSI meter 222 (shown in conduit 214). While, the sensors are shown in two different conduits (214, 216), those skilled in the art will appreciate that both (and additional) conduits may have each of the above-described sensors as well as additional sensors.

Step 312 may also be implemented to determine if the ingredient (or one of the ingredients) is a non-Newtonian fluid. This determination may be based one or more measurements of steps 308-310 and/or based upon known information regarding the ingredient. For example, an electronic signal may be transmitted from the electronic circuitry 129 that is indicative that the ingredient(s) in at least one conduit 214, 216 is/are non-Newtonian. If at step 312, it is determined that the ingredient is non-Newtonian, step 314 may be implemented. At step 314, one or more sensors may detect or otherwise measure the shear stress and/or strain rate of the ingredient(s). In one embodiment, a first sensor in a first conduit 214 may be used to detect the flow rate of a first fluid; however, a second sensor in the same first conduct 214 may be used to detect the flow rate of a second fluid.

In those embodiments, where the ingredient is non-Newtonian, the shear stress could utilize sensors to first measure the gradient of for example, by using a first sensor to measure the gradient of the velocity profile at the walls of the conduit 214, 216. Computer-executable instructions on computer-readable medium 204 may use processor 206 to multiply the signal from the first sensor by the dynamic viscosity to provide the shear stress of that particular ingredient or combination of ingredients. In one embodiment, one or more micro-pillar shear-stress sensors may be used in conduit(s) 214, 216. The micro-pillar structures may be configured to flex in response to the drag forces in close proximity to the outer perimeter of the conduit(s) 214, 216 (i.e., the walls). The flexing may be detected electronically, mechanically, or optically. The result of the flexing may be received as an electronic signal by computer-executable instructions on computer-readable medium 204. Processor 206 may utilize the received electronic signal to determine wall-shear stress. As discussed above, one or more of the conduits 214, 216 may comprise a temperature sensor 218, which may transmit electronic signals as an input to electronic circuitry 129. The input from temperature sensor 218 may also be used in conjunction with one or more other sensors to determine the viscosity of an ingredient of composition comprising a plurality of ingredients.

Further aspects of the invention relate to novel uses of adjustable orifices. For example, in certain embodiments, rather than implement the volumetric measurement then dispensing of ingredients, adjustable orifices may be used to simultaneously measure and dispense ingredients. For example, as an ingredient (or compositions having a plurality of ingredients) flows through a conduit, flow meter 220 and temperature meter 218 may determine the viscosity of the ingredient. Based upon the parameters detected by meters 218 and 220, information may be received from the electronic circuitry 129 that adjusts, rather than merely opening or closing, an orifice (see, e.g., elements 126 and 224 within conduit 214 within the conduit 214, 216). In certain embodiments, this may result in a more homogeneous combination of the ingredients. In other embodiments, it may result in less wear and tear on the dispensing device 202. In yet further embodiments, it may result in more efficient measurements of ingredients. Obtaining accurate measurements of ingredients may be of special importance, for example, when dealing with micro-nutrients, such as nutrients that comprise less than about 5% of the entire beverage or composition. In certain embodiments, a first ingredient may be dispensed from dispensing system 202 or at about 6% of the final beverage.

In one embodiment, the flow rate of at least one ingredient may be adjusted by the same mechanism that measures the flow rate. For example, exemplary flow rate sensor 220 (shown in conduit 216 of FIG. 2) may comprise a turbine or a paddle meter that is configured to measure the flow rate of an ingredient within conduit 216 (this measurement may be conducted in cooperation with information received from one or more other sensors within dispensing device 202). Based upon the determination of the flow rate, electronic circuitry 129 may transmit a signal that causes a drag placed upon at least a portion of sensor 220 (such as a turbine or paddle portion) thus acting as a restrictive orifice, such that the quantity of ingredient that is dispensed through conduit over a predetermined period of time is reduced. Likewise, electronic circuitry 129 may transmit a signal that causes less drag placed upon at least a portion of sensor 220, (i.e., at least a turbine or paddle), thus acting to increase the quantity of ingredient that is dispensed through conduit over a predetermined period of time is reduced. This may occur during or before step 316, in which it is determined whether further ingredients are to be dispensed. In further embodiments, one or more parameters of any ingredient being dispensed may be adjusted based upon information received from one or more sensors (such as sensors 218 and/220). For example, the carbonation levels of the ingredient may be altered to adjust the viscosity of the ingredient being dispensed.

Further, in the preparation of certain compositions to be dispensed, it may not be desirable to dispense a first ingredient under the same pressure as a second ingredient (for example, when dispensing a second ingredient at step 318). In some instances, it may be desirable to reduce the pressure under which a first ingredient is dispensed, in yet other embodiments; it may desirable to increase the pressure that an ingredient is dispensed, for example, to ensure proper mixing or the intended profile of the beverage. In certain embodiments, adjustable orifices may be implemented to ensure the optimal flow rate is implemented for certain ingredients. For example, computer-readable instructions may be used to achieve the optimal combination of pressure and flow rate of an ingredient passing through a conduit 214, 216, such as by use of an adjustable orifice. A simplified graphical illustration is shown by way of element 226. As seen by element 226, adjusting an input, such as through a step motor (for example "35°", "55°", or "75°") may be used to obtain a preferred combination of flow rate and pressure. Those skilled in the art will readily appreciate that element 26 is merely illustrative and that other implementations, including the use of more than three adjustable settings, are within the scope of this disclosure.

At step 320, information regarding the dispensed beverage or composition may be stored on a computer-readable medium, such as computer-readable medium 204. The computer-readable medium of step 320 is not, however, required to be within or local to the dispensing system 202. Instead, the information regarding the dispensed beverage may be transmitted through network connection 212 to a remote computer-readable medium. In one embodiment, the unique composition dispensed through the implementation of one or more methods shown in FIG. 3 may be received at a second dispensing system, which may dispense the substantially the same beverage or composition.

Figure 4:
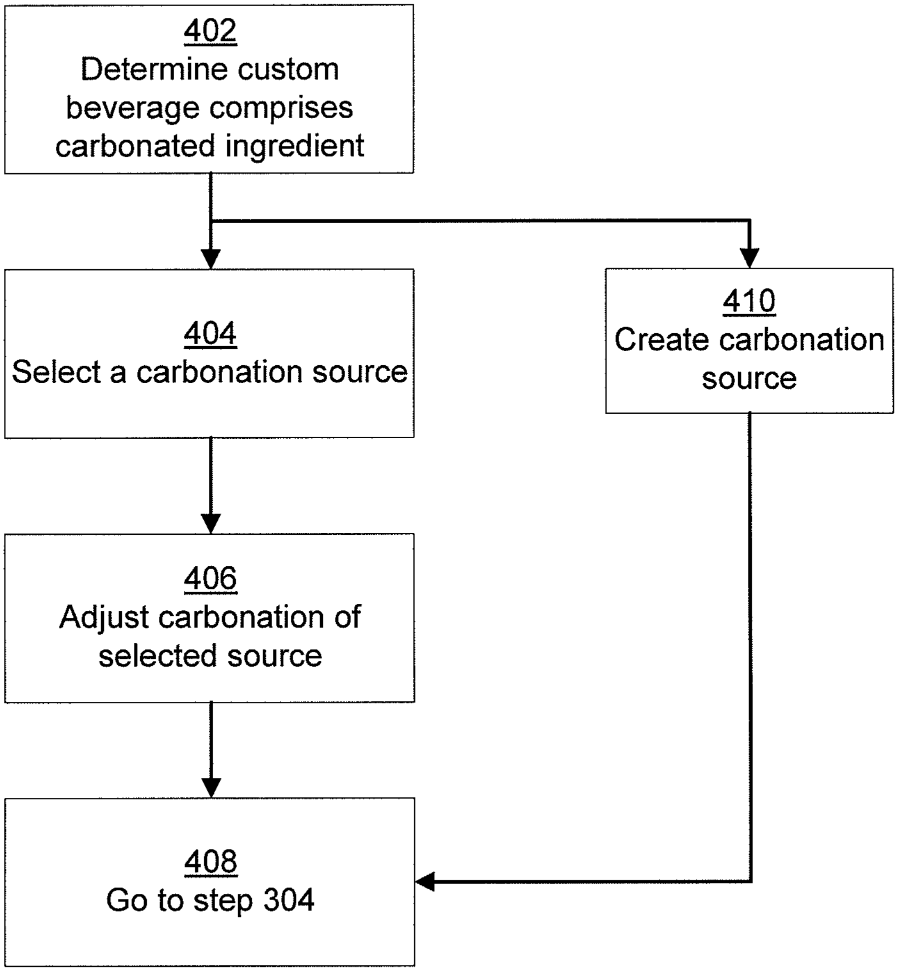
FIG. 4 is a flowchart of an exemplary method in accordance with one embodiment of the invention.

FIG. 4 shows a flowchart of an exemplary method in accordance with one embodiment of the invention. At step 402, it may be determined whether a custom beverage comprises a carbonated ingredient, such as carbonated water. In one embodiment, steps 404 and/or 406 may be performed to select a carbonation source (step 404) and adjust the carbonation of the selected source (step 406). For example, at step 404, it may be determined that the beverage requested contained carbonated water, however, the user requested that the beverage comprise less high fructose corn syrup, therefore the carbonation levels of the beverage may be reduced. Commonly assigned U.S. patent application Nos. 12/703,048 and 12/703,003, which are disclosed herein by reference in their entirety, disclose systems and methods relating to the creation and dispensing of novel beverage compositions. In one embodiment, the level of carbonation (or any gas) of a second ingredient is adjusted based upon electronic signals received from one or more signals regarding measurements from sensors measuring parameters of a first ingredient. Such parameters may be the flow rate, viscosity, pH, pressure, level of carbonation, level of constituents, such as sugar, water, coloring, etc., and/or any combination of these and other parameters that relate to the first ingredient.

In certain embodiments, the carbonation source selected in 404 may be one of a plurality of sources. For example, different sources may comprise various levels of carbonation; therefore, one source comprising the closest amount of carbonation needed may be selected before adjustment. In certain embodiments, dispensing system 102, 202 may selectively discharge streams of carbonized and non-carbonized water from separate containers, for example, reservoirs 112*a*-112*b*. Therefore, in certain implementations, the dispensing head 104 can be employed to dispense beverages selectively made from either carbonized or non-carbonized water. Alternatively, the dispensing head 104 may be used to dispense a beverage comprising carbonated water and non-carbonated water. In one embodiment, adjustable orifices are opened simultaneously to cause the simultaneous dispensing of both carbonated and non-carbonated water. This is useful when it is desired to blend these two liquids with a concentrate to produce a lightly carbonated beverage. In one embodiment, by varying the amount of time each orifice is open at one or more predetermined diameters, the extent to which the water supplied for the beverage may be set anywhere between fully carbonated (100% carbonated water supply) to no carbonation (100% non-carbonated water supply).

In yet other embodiments, step 410 may be used to create a carbonation source. In one embodiment, a first conduit such as conduit 214 may comprise water and conduit 216 may comprise carbon dioxide gas. Thus, based upon the sensors 218, 220, 222, and/or other sensors within conduits 214, 216 or elsewhere within dispensing system 202, the amount of water that is combined with the carbon dioxide gas is determined and dispensed, such as through an adjustable orifice. Regardless of whether steps 404 and 406 or step 410 is implemented, step 408 may be initiated. In one embodiment, the resultant carbonated ingredient may be dispensed into a conduit, such as conduits 214 and/or 216. (see, e.g., step 304 of FIG. 3).

It should further be appreciated that not embodiments have all of the above-described features and/or include each step and/or process of the disclosed methods. For example, certain embodiments may be provided with different quantities of fluid passageways and valve units than have been described above with respect to the illustrated embodiments. It is anticipated that these alternative embodiments of the invention may be used to provide a means for forming a beverage from a combination of a plurality of ingredients, which may be discharged from a either a plurality of nozzles or, alternatively, a single nozzle. Moreover, one or more nozzles may be configured to provide a discharge passage that extends vertically downward. Yet in other embodiments, one or more discharge passages for ingredients may have a spiral or helical configuration. While the exemplary dispensing system 102 shown in FIG. 1 may be used in a commercial setting, for example, a restaurant, those skilled in the art will readily appreciate that the teachings of this disclosure may be applied to any dispensing system, such as implemented in bar gun technology and/or residential use. Further, embodiments within the scope of this disclosure may be used with frozen beverages and/or non-carbonated beverages.

Figure 5:
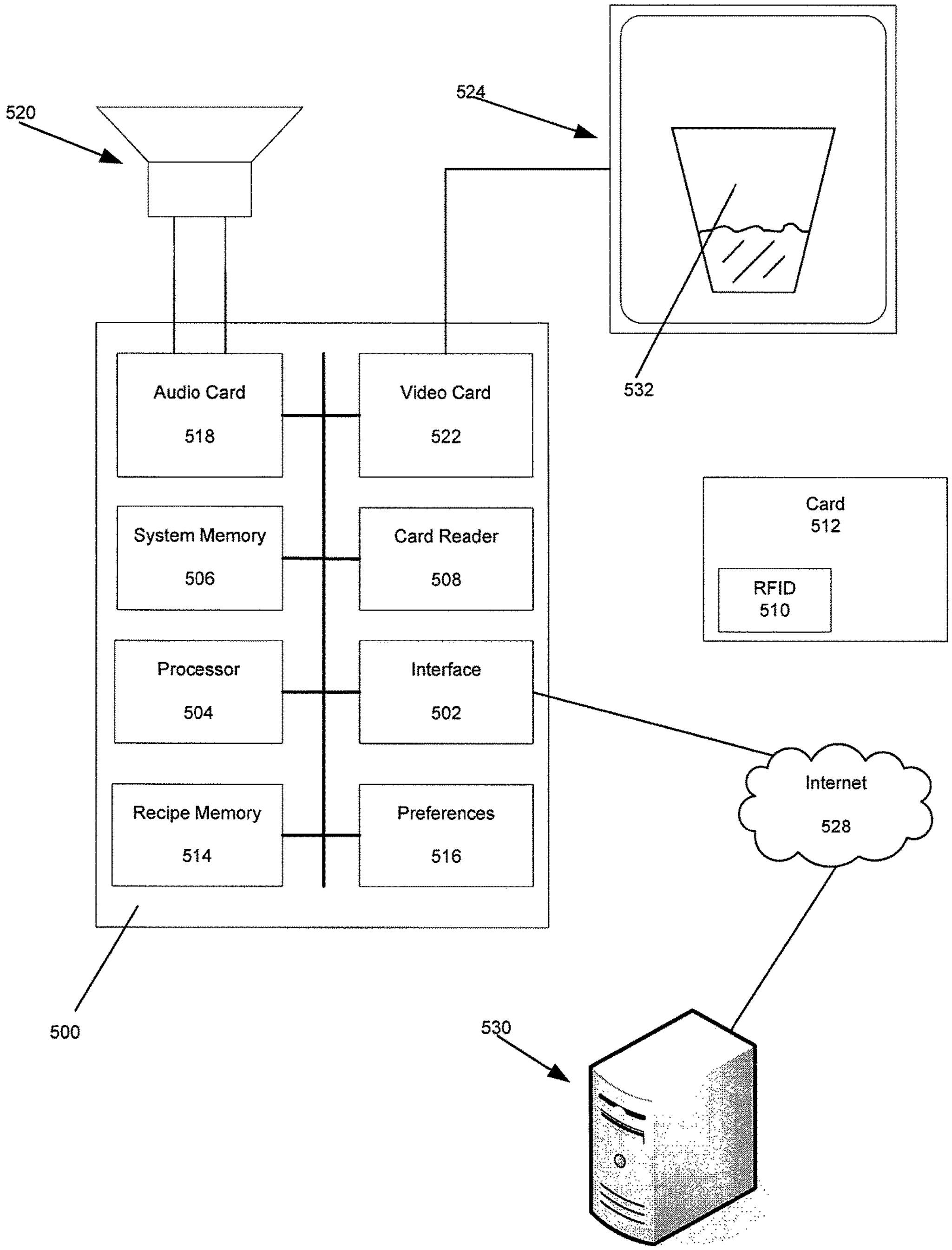
FIG. 5 shows a computer device that may be used to control the operation of a beverage dispenser, in accordance with an embodiment of the invention.

FIG. 5 shows a computer device 500 that may be used to control the operation of a beverage dispenser, in accordance with an embodiment of the invention. Device 500 may include at least one network interface 502 for receiving and sending data traffic, a central processor 504 and a system memory 506. Interface 502 may be any type of network interface well known to those skilled in the art. Network interface 502 may be used to connect device 500 to a network, such as the Internet 528, and various devices and servers, such as server 530. Central processor 504 may be implemented with a variety of different central processing units. The structure of system memory 506 is well known to those skilled in the art and may include a basic input/output system (BIOS) stored in a read only memory (ROM) and one or more program modules such as operating systems, application programs and program data stored in random access memory (RAM).

Device 500 may also include a card reader 508, such as a radio frequency identification (RFID) card reader for reading information stored in an RFOD tag 510 attached to a card 512. A recipe database 514 may be used to store a variety of beverage recipes. Some of the recipes may be custom recipes created by users. A preferences database 516 may store preferences selected by users.

Device 500 may be configured to provide audio and/or video information while drinks are dispensed. An audio card 518 may be included to drive a sound device, such as a speaker 520. A video card 522 may be included drive a video display 524. Audio and video cards are conventional components and are widely available. Video display 524 may be implemented with a liquid crystal display (LCD), light emitting diode (LED) display or any other type of display. In one embodiment, display 524 is a touch screen and is attached to the front of the dispenser. The touch screen may be configured to receive beverage selections from users.

The various components within device 500 may be connected with a system bus 526. System bus 526 may be any of several types of bus structures including a memory bus or memory controller, a peripheral bus, and a local bus using any of a variety of bus architectures In operation device 500 may receive beverage selections at a touch screen and provide audio and/or video information to the user. For example, speaker 520 may generate a sound that changes as a container is filled with a beverage. The sound may correspond to the fill state of the beverage and/or the type of beverage. The volume and tempo of the sound may increase as the container is filled. In one embodiment a bubbling sound is played when carbonated beverages, such as colas, are selected. A non-bubbling sound may be played when noncarbonated beverages, such as fruit juices, are selected.

Display 524 may display an image 532 that is updated to reflect the fill state of a cup or other container. Image 532 may also show beverage ingredients flowing into the container. Ingredients may have different colors or other appearances.

Figure 6:
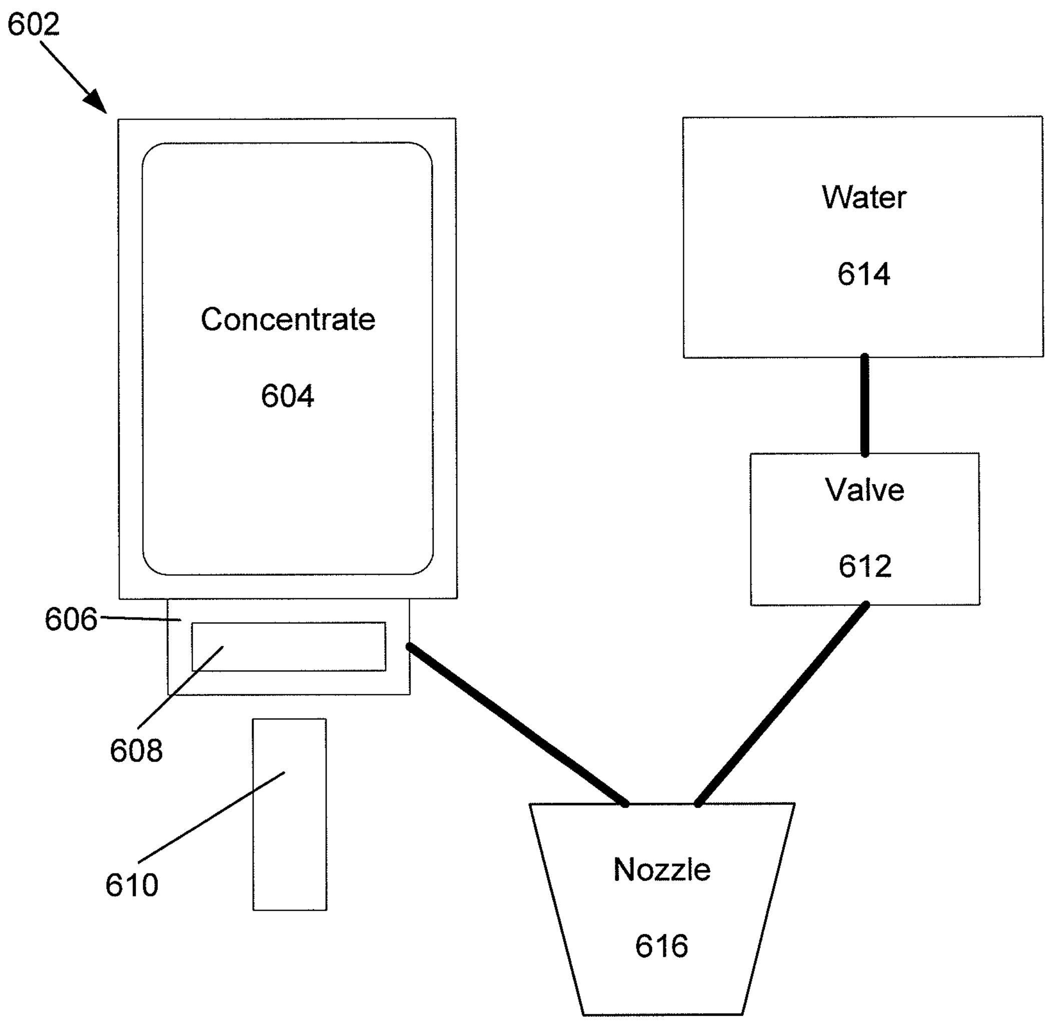
FIG. 6 illustrates a bag-in-box dispensing system in accordance with an embodiment of the invention.

FIG. 6 illustrates a bag-in-box dispensing system in accordance with an embodiment of the invention. A bag-in-box container 602 may contain a concentrate 604. Bag-in-box 602 may include a collapsible bag surrounded by a relatively rigid box. A connector 606 is included to connect bag-in-box 602 to another component. Connector 606 may include a rotary pump that is used to dispense fluid from bag-in-box container 602. In some embodiments, pump 608 is molded into connector 606. An exemplary rotary pump is described in detail below. A drive source 610 may be included to drive rotary pump 608.

The bag-in-box dispensing system shown in FIG. 6 may include several additional conventional components. In one embodiment, a valve 612 is used to control the dispensing of water from a water source 614. Water source 614 may contain carbonated water. Of course, in various embodiments of the invention water may be replaced with another diluent. Water and concentrate may be mixed at a nozzle 616.

Figure 7:
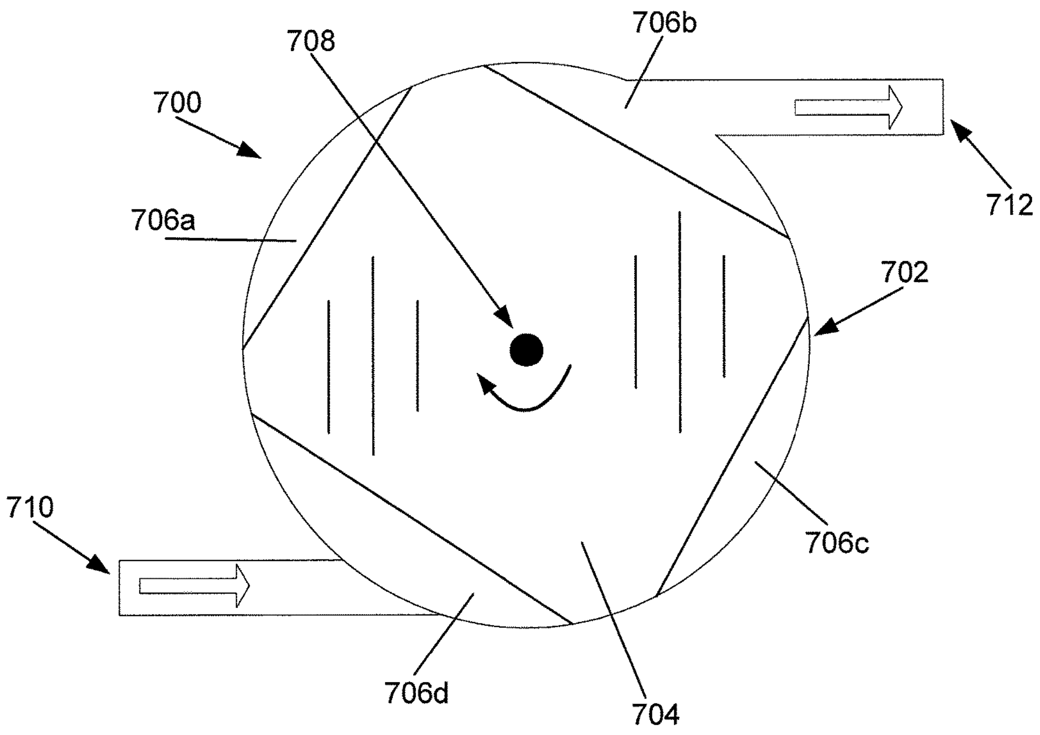
FIG. 7 illustrates an exemplary rotary pump that may be used with various embodiments of the invention.

FIG. 7 illustrates an exemplary positive displacement pump such as a rotary pump 700 that may be used with various embodiments of the invention. Rotary pump 700 includes a resiliently deformable housing 702 and a rotor 704 that form a plurality of chambers **706*a*, 706*b*, 706*c* and 706*d*. Housing 702 may be formed of plastic, such as polyethylene or polypropylene. Rotor 704 may also be formed of plastic. In some embodiments, rotor 704 is formed of a metal such as stainless steel or a magnetic material encapsulated in lubricous plastic material. In operation, chambers 706*a*, 706*b*, 706*c* and 706*d* rotate around axis 708 and transport fluid from an inlet port 710 to an outlet port 712. Rotary pump 700 may be used for metering the transfer of fluid from inlet port 710 to outlet port 712**. Of course, other embodiments may include additional inlet ports and/or outlet ports. Quantex provides pumps that may be used with aspects of the invention.

Rotor 704 may be driven by an external motor. In one embodiment, the motor may be part of a tube that connects to the connector that contains the rotary pump. The motor may include a shaft that is physically formed to engage with specific rotors. This embodiment may prevent improper installation and the use of counterfeit products. In embodiments that utilize a metal or magnetic rotor, the motor may be magnetically coupled to the rotor. In one embodiment of the invention, the bag-in-box container may include an RFID tag that includes information necessary to drive a pump, such as a rate of revolution to obtain a desired metering of concentrate.

Placing a relatively low cost rotary pump within a bag-in-box container can result in a low cost disposable fluid storage system. Moreover, since the pumps will only be used when emptying and/or filling the bag-in-box containers, use and failure rates will be relatively low.

Figure 8:
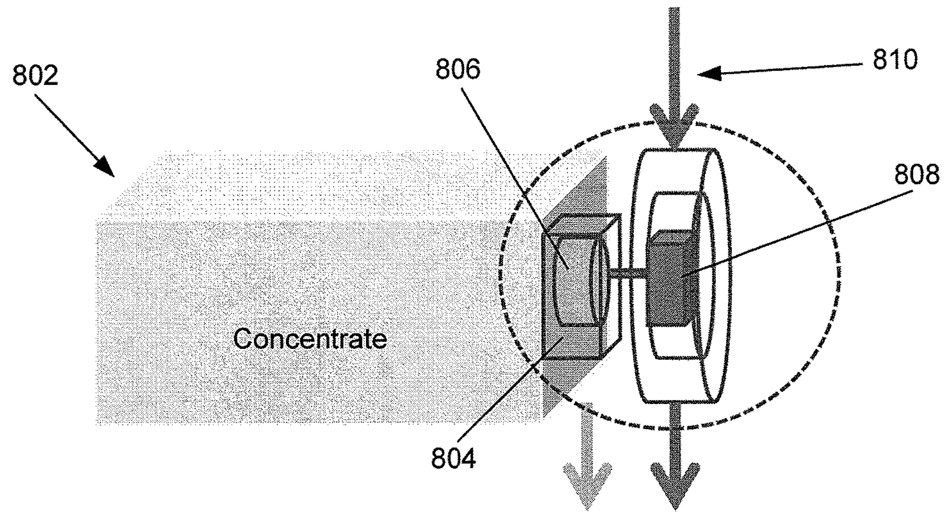
FIG. 8 illustrates a bag-in-box dispensing system that utilizes a water powered motor to drive a rotary pump, in accordance with an embodiment of the invention.

FIG. 8 illustrates a bag-in-box dispensing system that utilizes a water powered motor to drive a rotary pump, in accordance with an embodiment of the invention. A bag-in-box container 802 includes a connector 804 that includes a rotary pump 806. A motor 808 is driven by a pressurized diluent stream, such as a water stream 810. A gear mechanism between motor 808 and rotary pump 806 may control the amount of concentrate dispensed from pump 806. In one embodiment, motor 808 and rotary pump 806 are configured so that concentrate is dispensed at a ratio of five parts water to one part concentrate. Various other embodiments may utilize ratios of 1 to 1 up to 1 to 100. The same water that is used to drive may motor 808 may be mixed with the concentrate output by rotary pump 806 to form a beverage. Of course, motor 808 may be driven by fluids other than water.

Figure 9:
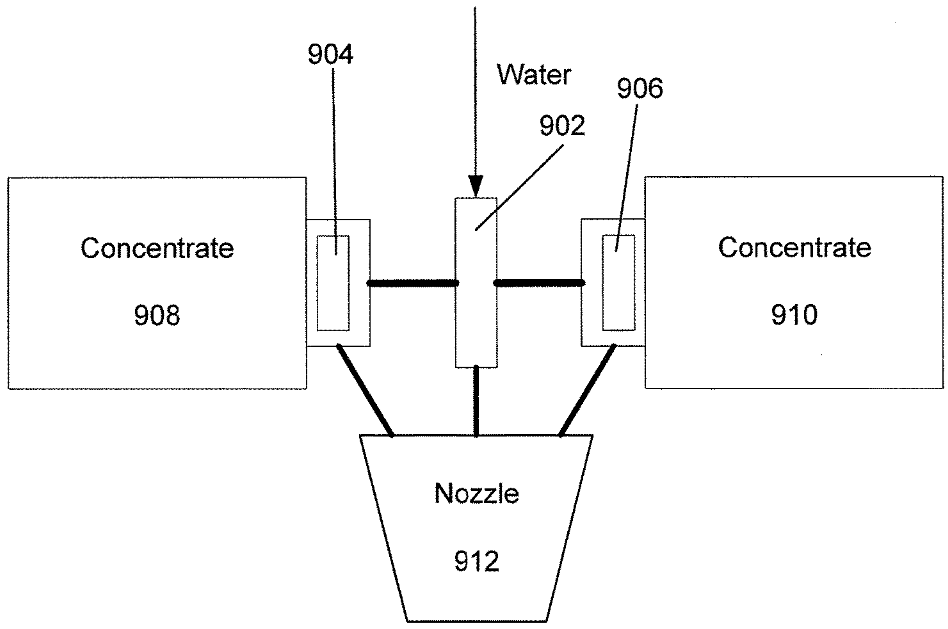
FIG. 9 illustrates a beverage dispensing system in which a water driven pump drives multiple rotary pumps, in accordance with an embodiment of the invention.

One or more fluid driven motors may be used to drive multiple rotary pumps. FIG. 9 illustrates an embodiment in which a diluent driven pump 902 drives rotary pumps 904 and 906. Gear mechanisms between motor 902 and rotary pumps 904 and 906 may be set to control the amounts of diluent, a first concentrate 908 and a second concentrate 910 mix at a nozzle 912.

Figure 10:
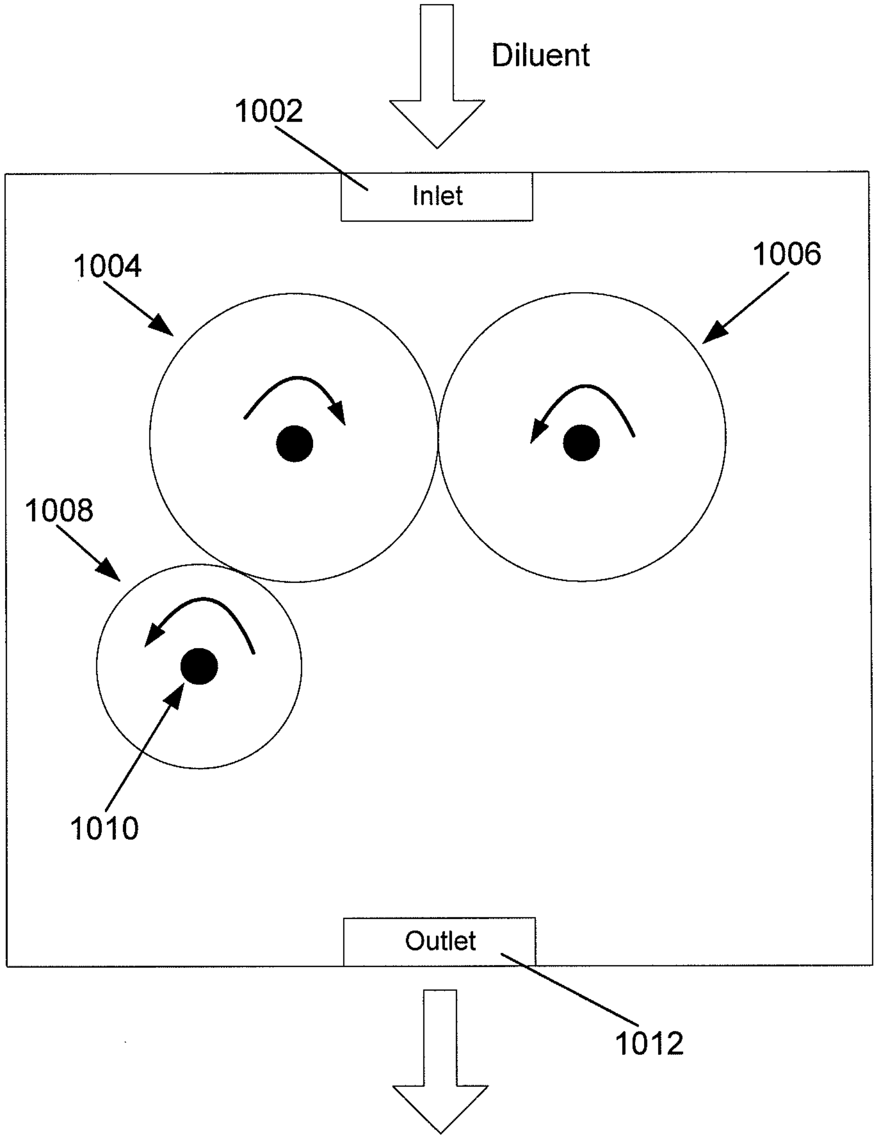
FIG. 10 illustrates a gear mechanism that harnesses energy from a diluent stream to drive a rotary pump, in accordance with an embodiment of the invention.

Those skilled in the art will appreciate that embodiments of the invention may use a variety of mechanical configurations to harness energy from a diluent stream to power a rotary pump. FIG. 10 illustrates an example in which a diluent stream enters an inlet port 1002 and rotates gears 1004 and 1006. Gear 1004 rotates gear 1008. A shaft, not shown, may be connected to gear 1008 at axis 1010 and may be used to drive a rotary pump. The diluent stream leaves via an outlet port 1012.

Figure 11:
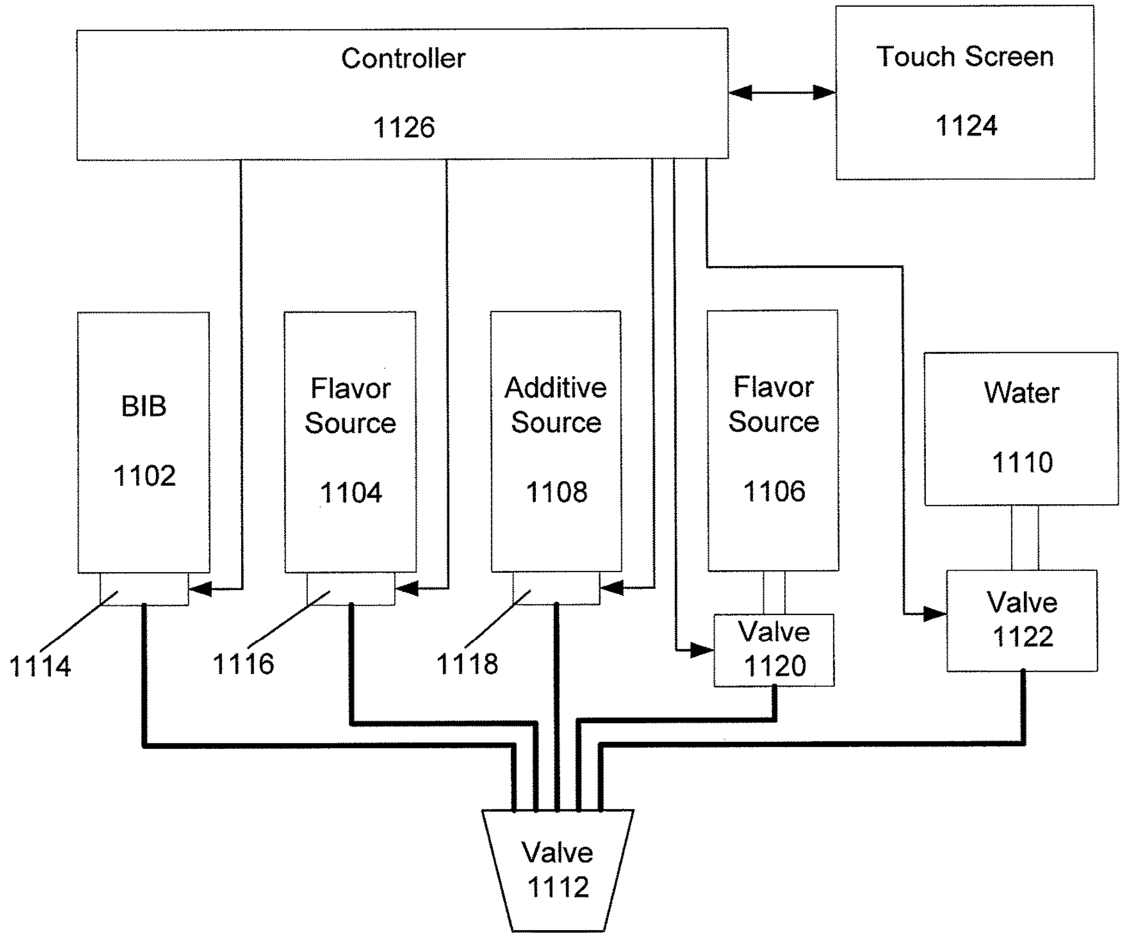
FIG. 11 illustrates an electronically controlled beverage dispensing system, in accordance with an embodiment of the invention.

FIG. 11 illustrates an electronically controlled beverage dispensing system, in accordance with an embodiment of the invention. A bag-in-box container 1102, flavor sources 1104 and 1106, additive source 1108 and water 1110 are connected to a dispensing valve 1112. Bag-in-box container 1102, flavor source 1104 and additive source 1108 may be packaged in containers that include rotary pumps 1114, 1116 and 1118. The dispensing of fluids from flavor source 1106 and water 1110 are controlled by valves 1120 and 1122. In operation a user may select a beverage or recipe via touch screen interface 1124. A controller 1126 then controls appropriate pumps and valves to dispense the selected beverage or recipe. Of course numerous additional or alternative beverage components may be included. The beverage components may be stored in mircro-catridges, bag-in-box containers or other containers and may be in the form of powders, films, gels, liquids or other forms of ingredients.

While the invention has been described with respect to specific examples and to presently preferred modes of carrying out the invention, those skilled in the art will appreciate that there are numerous variations of the above described systems and methods that may fall within the spirit and scope of the invention. It should be further noted that certain aspects of the present invention have been described herein, but the invention is not limited to the embodiments described. The following claims demonstrate the breadth of the invention.

We claim:

1. A bag-in-box package for a dispensing system, the bag-in-box package comprising:
- a rigid box;
- a flexible bag disposed within the box and having a connector projecting outwardly of the box; and
- a rotary pump located within the connector, the rotary pump having a resiliently deformable housing and a rotor located within a fluid path that form a plurality of chambers that are configured to meter the transfer of fluid from an inlet port to an outlet port, the rotor located internally within the rotary pump;
- wherein the rotor is formed of a magnetic material.

2. The bag-in-box package of claim 1, wherein the resiliently deformable housing is formed of plastic.

3. The bag-in-box package of claim 1, wherein the rotary pump is disposable.

4. A beverage dispensing system comprising:
- a concentrate container having a connector, the connector comprising a rotary pump located within the connector and having a resiliently deformable housing and a rotor located within a fluid path that form a plurality of chambers that are configured to meter the transfer of fluid from an inlet port to an outlet port, the rotor located internally within the rotary pump; and
- a motor coupled to the pump to drive the pump;
- wherein the motor controls the volumetric dispensing of concentrate from the concentrate container and wherein the motor comprises a fluid driven pump.

5. The system of claim 4, wherein the concentrate container comprises a bag-in-box container.

6. The system of claim 4, wherein the motor is mechanically connected to the pump.

7. The system of claim 4, wherein the motor is magnetically coupled to the pump.

8. The system of claim 7, where in the pump includes a magnetic rotor.

9. The system of claim 4, further including a mixer that mixes fluid used to drive the pump and concentrate from the concentrate container.

10. The system of claim 9, wherein the mixer comprises a nozzle.

11. The system of claim 9, wherein the mixer comprises a mixing trough.

12. A beverage dispensing system comprising:
- a memory that stores beverage recipes;
- a user input device that receives a beverage selection corresponding to a recipe;
- a plurality of beverage component containers, each beverage component container having a connector that comprises a rotary pump located within the connector, the rotary pump having a resiliently deformable housing and a rotor located within a fluid path that form a plurality of chambers that are configured to meter the transfer of fluid from an inlet port to an outlet port, the rotor located internally within the rotary pump; and
- a processor programmed with computer-executable instructions to cause the beverage dispensing system to:
  receive the beverage selection; and drive at least a first rotary pump to dispense a first volume of beverage component from a first beverage component container in accordance with the recipe.

13. The beverage dispensing system of claim 12, wherein the processor is further programmed with computer-executable instructions to cause the beverage dispensing system to:

drive at least a second rotary pump to dispense a second volume of beverage component from a second beverage component container in accordance with the recipe.

14. The beverage dispensing system of claim 13, further comprising a water container and the processor is further programmed with computer-executable instructions to cause the beverage dispensing system to control a valve coupled to the water container to dispense a volume of water in accordance with the recipe.

15. The beverage dispensing system of claim 12, wherein the user input device comprises a touch screen.

16. The beverage dispensing system of claim 12, further including a sound device configured to play sound corresponding to a beverage selected with the user input device while a beverage is being dispensed.

* * * * *